Figures 3, 4:
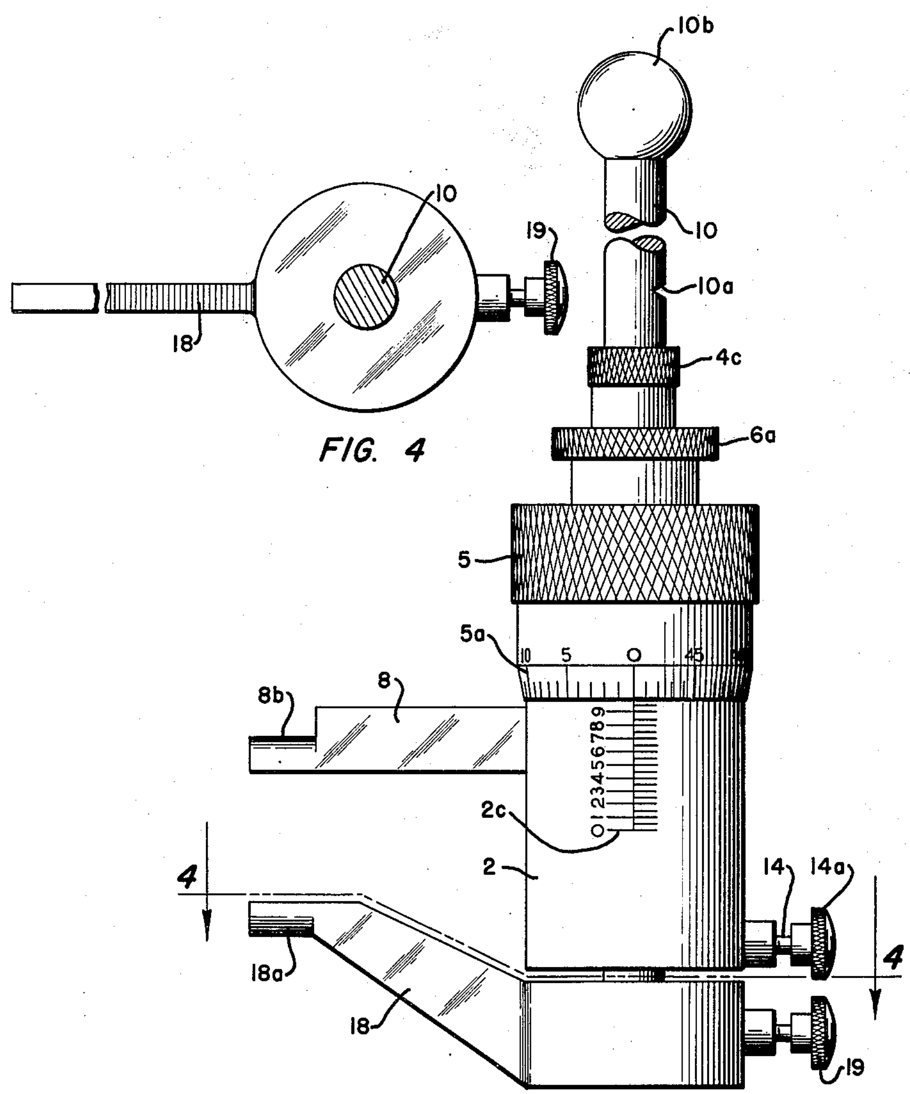

Sept. 23, 1952 R. R. NOBLE 2,611,186
MICROMETER HEIGHTH GAUGE
Filed Nov. 5, 1945 2 SHEETS—SHEET 1
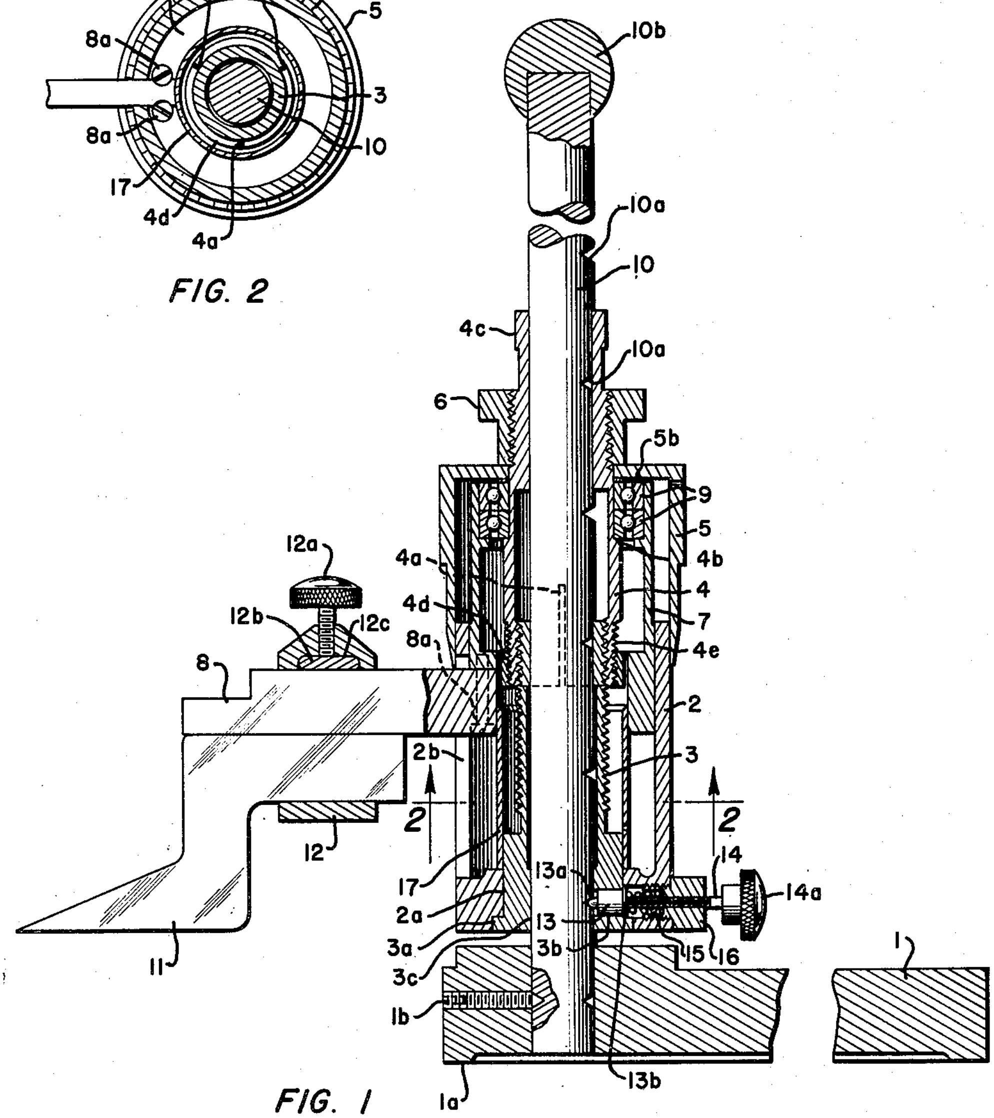
INVENTOR.
ROBERT R. NOBLE
BY
A. B. Bowman
ATTORNEY Sept. 23, 1952 R. R. NOBLE 2,611,186

MICROMETER HEIGHTH GAUGE

Filed Nov. 5, 1945 2 SHEETS—SHEET 2

INVENTOR.
ROBERT R. NOBLE
BY
A. B. Bowman
ATTORNEY

Patented Sept. 23, 1952 2,611,186

UNITED STATES PATENT OFFICE 2,611,186

MICROMETER HEIGHTH GAUGE

Robert R. Noble, San Diego, Calif.

Application November 5, 1945, Serial No. 626,671

17 Claims. (Cl. 33—169)

1

My invention relates to a micrometer heighth gage, for making precision measurements in connection with surface plates or the like and the objects of my invention are:

First: To provide a micrometer heighth gage of this class which may be readily converted into an inside and outside micrometer for measuring internal and external diameters as well as linear dimensions.

Second: To provide a micrometer heighth gage of this class which is provided with a center post graduated in inches which may be readily adjusted for measuring in thousandths of an inch any dimensions from zero to as much as thirty inches or more.

Third: To provide a micrometer heighth gage of this class in which the diameter of the dial sleeve is such that measurements may be read without the use of a magnifying glass.

Fourth: To provide a micrometer heighth gage of this class which is easily read in connection with a surface plate or the like and does not have to be removed for taking the reading therefrom.

Fifth: To provide a micrometer heighth gage of this class in which a coarser micrometer thread may be used due to the large diameter of the dial sleeve having a relatively great circumferential measurement for disposition of the graduations thereon.

Sixth: To provide a micrometer heighth gage of this class in which adjustments for inches may be readily made by turning the micrometer substantially 90 degrees on the post and moving the same longitudinally thereof then rotating the micrometer in connection with the post until it engages one of the graduation notches thereof.

Seventh: To provide a micrometer of this class which has a very fast linear adjustment speed due to the coarse thread used cooperatively with the large diameter dial sleeve.

Eighth: To provide a micrometer heighth gage of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon forming a part of this application, in which:

Fig. 1 is a fragmentary longitudinal sectional view of my micrometer heighth gage showing

2 parts and portions in elevation to facilitate the illustration. Fig. 2 is a fragmentary transverse sectional view taken from the line 2—2 of Fig. 1. Fig. 3 is a side elevational view of the micrometer of my micrometer heighth gage showing an arm secured in place of the base thereof for use in making inside and outside measurements. And Fig. 4 is a fragmentary sectional view taken from the line 4—4 of Fig. 3.

Similar characters of reference refer to similar parts and portions throughout the several views of the drawing.

The base 1, outer guard casing 2, threaded sleeves 3 and 4, dial sleeve 5, nut 6, arm supporting sleeve 7, arm 8, bearings 9, graduated post 10, arm extension 11, clamp 12, detent 13, detent screw 14, detent spring 15, detent nut 16, retainer sleeve 17, and the inside and outside measurement arm 18 constitute the principal parts and portions of my micrometer heighth gage.

The base 1 is provided with a precise flat relieved lower surface 1*a* adapted to rest on surface plates or the like, and this base 1 is secured in connection with the post 10 by the set screw 1*b* engaging a recess in said graduated post 10. The graduated post 10 is circular in cross-section as shown in Fig. 2 of the drawing and is provided with spaced notched portions 10*a* in one side thereof which are precisely one inch apart. The upper end of the graduated post 10 is fitted with a spherical nob portion 10*b* for handling the graduated post 10. It will be here noted that this graduated post 10 may extend for thirty inches or more of the base 1 as desired according to the overall dimensions of the measurement which it is desired to make.

The casing 2 is hollow and cylindrical in form and secured concentrically therein is the threaded sleeve 3. This threaded sleeve 3 is provided with an annularly flanged base portion 3*a* positioned in the reduced bore 2*a* of the outer casing 2 at its lower end, as shown best in Fig. 1 of the drawings. The threaded sleeve 3 is provided with an internal bore 3*c* contiguous with the outer side of the graduated post 10 and communicating with this bore 3*c* is a port 3*b* in which the detent 13 is slidably positioned and provided with a nib 13*a* arranged to engage the graduated notch portions 10*a* of the graduated post 10 for maintaining the outer sleeve 2 and the threaded sleeve 3 in certain elevated position relatively to the base 1 on the graduated post 10. It will be here noted that the detent 13 is provided with a flange portion 13*b* having a straight portion at its lower side engageable with the annular flange portion 3a of the threaded sleeve 3 maintaining the detent 13 in alignment with the notched portions 10a of the post 10 and preventing the same from rotating in the port 3b of said threaded sleeve 3.

The detent nut 16 is screw threaded in the outer casing 2 and supports the detent spring 15 at its inner end which spring 15 provides resilient engagement of the detent 13 with the graduated notched portions 10a of the graduated post 10. Screw threaded in this nut 16 is the detent screw 14 arranged to positively engage the detent 13 for maintaining precise engagement of the detent 13 with the notched portions 10a of the graduated post 10. The outer casing 2 is provided with a vertically disposed slotted portion 2b in one side thereof through which the arm 8 travels in vertical relation therewith, all as shown best in Fig. 1 of the drawing. As shown in Fig. 3 of the drawings the outer casing 2 is provided with graduated designation 2c thereon numbered from 1 to 10. These graduations 2c cooperate with the radially disposed graduations 5a of the dial sleeve 5 which is rotatably positioned about the periphery of the outer casing 2. As shown in Fig. 1 of the drawings, the arm supporting sleeve 7 is reciprocally mounted in the outer casing 2 and supports the arm 8 extending through the longitudinally slotted portion 2b of said outer casing 2, the inner end of the arm 8 being bound in an enlarged lower annular portion of the sleeve 7 as by means of anchor screws 8a. The upper end of the arm supporting sleeve 7 engages the preloaded bearings 9 which surround and engage the threaded sleeve 4 which is arranged in vertically screw threaded relation with the upper end of the threaded sleeve 3 surrounding the graduated post 10. It will be noted that this threaded sleeve 4 at its lower end is provided with split skirt portions 4a engaged at their outer side by a nut 4d arranged to maintain precise engagement and disposition of the screw thread of said threaded sleeves 3 and 4 which constitute the micrometer thread of my micrometer height gage.

As shown in Fig. 1 of the drawings, the bearings 9 are shouldered between the shoulder portion 4b of the threaded sleeve 4 and the under side of the top portion 5b of the dial sleeve 5. The outer races of these preloaded bearings 9 are secured in longitudinally fixed relation with the arm supporting sleeve 7. It will be noted that the nut 6 is connected in screw threaded relation with the threaded sleeve 4 at the outer side of the dial sleeve 5 and is arranged to maintain the same in precise engagement with the inner races of the bearings 9 for fixing the dial sleeve 5 in certain position relatively to the threaded sleeve 4. The outwardly extending end of the threaded sleeve 4 is provided with a knurled portion 4c and the nut 6 is provided with a similar knurled portion 6a, as shown in Fig. 3 of the drawing. It will be here noted that the threaded sleeve 3 contiguous at its inner side with the graduated post 10 is provided with external threads engageable with the internal threads of the threaded sleeve 4 at the split skirt portions 4a which are radially adjustable by means of the nut 4d on the tapered external threaded portion 4e. A protecting retainer sleeve 17 is secured around the threaded sleeve 3 in spaced relation with the screw thread thereof and this retainer sleeve 17 is tightly fitted for recriprocal operation internally of the arm supporting sleeve 7 thus operating as a dust seal for maintaining the threaded sleeves 3 and 4 dust free and abrasive free. As shown in Fig. 2 of the drawings the arm 8 is secured to the arm supporting sleeve 7 by screws 8a screw threaded in the arm supporting sleeve 7 and engaging opposite sides of said arm 8. It will be here noted that the arm supporting sleeve 7 is provided with a close tolerance fit inside the outer casing 2 cooperating with the preloaded bearings 9 for precision support of the arm 8. The bearings 9 provide free rotative operation of the threaded sleeve 4 together with the dial sleeve 5 relatively to the arm supporting sleeve 7.

The operation of my micrometer height gage is substantially as follows:

When the base 1 is resting on a surface plate or the like the arm extension 7 is arranged to measure the height of certain objects resting on the common surface plate. By turning the dial sleeve 5 measurements in thousands of an inch may be taken in connection with the arm extension 7 and precise measurements in inches may be taken by loosening the screw 14 by the head 14a thereof releasing the detent 3b from positive engagement with the screw 14 whereby the outer casing 2 together with the threaded sleeve 3 may be rotated 90 degrees upon the graduated post 10 releasing the detent 13a from one of the graduated notched portions 10a of the graduated post 10. Thus the micrometer may be longitudinally adjusted on the graduated post 10 to the desired measurement in inches then rotated 90 degrees until the detent portions 13a contacts another of the graduated notched portions 10a of the graduated posts 10. Thus it is possible to measure precisely in thousandths of an inch from a zero measurement to any number of inches as desired according to the length of the graduated posts 10. When the detent portion 13a is placed in one of the graduated notch portions 10a the screw 14 is solidly engaged with the rear thereof by turning the thumbpiece 14a maintaining precise engagement of the detent portion 13a with the said graduated notch portions 10a. When it is desired to adjust the micrometer in order to zero the same, the nut 6 is loosened in its screw threaded relation with the threaded sleeve 4 and the dial sleeve 5 may be turned to the zero setting and set in such position by tightening the nut 6 which engages the dial sleeve 5 with the preloaded bearings 9. When it is desired to adjust the micrometer threads of the threaded sleeves 3 and 4, the nut 4d is rotated on the tapered threaded portions 4e of the threaded sleeve 4 radially adjusting the slit skirt portions 4a of the threaded sleeve 4 for precise engagement with the external threads of the threaded sleeve 3. It will be here noted that the circumference of the dial sleeve 5 is relatively great providing fairly wide spaced relation of the graduation designations 5a thereon permitting the use of a fairly coarse thread on the threaded sleeves 3 and 4.

The clamp 12 is used in connection with the arm 8 for securing thereon the extension 11 or other tools as desired. This clamp is provided with a set screw 12a and a pad 12b engaged thereby which is held in a recess 12c. The pad 12b being engageable with the arm 8 and adjusted by the screw 12a. As shown in Fig. 3 of the drawings the inside and outside measurement arm 18 is connected with the post 10 in place of the base 1 for cooperative operations with the arm 8 in taking various inside and outside measurements. In connection with the arm 18 is a set screw 19 similar to the set screw 14 having connected detent mechanism similar to that in connection with the set screw 14 for maintaining said inside and outside measurement arm 18 in engagement with the graduated post 10. It will be noted that the inside and outside measurement arm 18 is provided with a feeler portion 18a arranged to cooperate with the feeler portion 8b of the arm 8.

Though I have shown and described a particular construction, combination and arrangement of parts and portions, I do not wish to be limited to the particular construction, combination and arrangement, but desire to include in the scope of my invention the construction, combination and arrangement substantially as set forth in the appended claims.

1. In a micrometer height gage of the class described, the combination of a base member, a vertically disposed graduated post having graduated notched portions therein, a pair of interengaging threaded sleeves surrounding and slidable along said graduated post, an outer casing connected to one of said threaded sleeves, a dial sleeve in connection with the other threaded sleeve and surrounding a portion of said outer casing and having graduation designations thereon, said dial sleeve and said casing cooperating to enclose said threaded sleeves, arm supporting means longitudinally fixed with respect to one of said threaded sleeves and rotatable relative to the other of said threaded sleeves, and an arm secured to said arm supporting means, said outer casing having a slot therein in which said arm is slidably positioned.

2. A combination as in claim 1 including a dust excluding sleeve disposed between said threaded sleeves and said outer casing in dust excluding engagement with said sleeves and casing, and in relatively fixed relation to one thereof and sliding relation to another to exclude dust and cuttings from the threads of said threaded sleeves.

3. A combination as in claim 1, wherein one of said threaded sleeves has attached thereto elongated bearing means slidably mounted on said post, said combination including means for locking the last mentioned sleeve on said outer casing against longitudinal movement on said post during sliding adjustment of said arm in said slot.

4 A combination as in claim 3 wherein said locking means is carried by said outer casing to engage said post and lock the casing against rotary movement on said post during sliding adjustment of said arm.

5. In a micrometer height gage of the class described, the combination of a base member, a vertically disposed graduated post having graduated notched portions therein, a pair of interengaging threaded sleeves surrounding and slidable along said graduated post, an outer casing connected to one of said threaded sleeves, a dial sleeve in connection with the other threaded sleeve and surrounding a portion of said outer casing and having graduation designations thereon, said dial sleeve and said casing cooperating to enclose said threaded sleeves, arm supporting means longitudinally fixed with respect to one of said threaded sleeves and rotatable relative to the other of said threaded sleeves, and an arm secured to said arm supporting means, said outer casing having a slot therein in which said arm is slidably positioned, graduation notch portions of said graduated post being precisely one inch apart.

6. In combination in a micrometer height gage: a base member; a vertically disposed post supported on said base; a pair of interengaging threaded sleeves slidably disposed upon said post; a dial sleeve connected with and disposed about one of said threaded sleeves to rotate the latter; a laterally projecting gaging arm longitudinally fixed with respect to one of said threaded sleeves and longitudinally movable with respect to the other of said threaded sleeves, one of said sleeves having elongated bearing means slidably mounted on said post; and locking means for locking the last mentioned sleeve against longitudinal movement on said post during longitudinal movement of said arm with respect to said other threaded sleeve, said locking means simultaneously locking the other of said threaded sleeves against rotary movement on said post during said longitudinal movement of said arm.

7. A combination as in claim 6 including an outer casing having connection with one of said sleeves and working within said dial sleeve and enclosing said threaded sleeves.

8. A combination as in claim 7, and a dust sleeve carried by one of said sleeves and working between said casing and said threaded sleeves.

9. In a micrometer height gage of the class described, the combination of a base member, a vertically disposed graduated post having graduated notched portions therein, a pair of interengaging threaded sleeves surrounding and slidable along said graduated post, an outer casing connected to one of said threaded sleeves, a dial sleeve in connection with the other threaded sleeve and surrounding a portion of said outer casing and having graduation designations thereon, said dial sleeve and said casing cooperating to enclose said threaded sleeves, arm supporting means longitudinally fixed with respect to one of said threaded sleeves and rotatable relative to the other of said threaded sleeves, and an arm secured to said arm supporting means, said outer casing having a slot therein in which said arm is slidably positioned, one of said threaded sleeves having split skirt portions and an externally tapered threaded portion, a nut engaging said tapered threaded portion arranged to compress said skirt portions, the other of said threaded sleeves provided with an external threaded portion engaging an internally threaded portion of said split skirt portions.

10. In a micrometer height gage of the class described, the combination of a base member, a vertically disposed graduated post mounted on said base member and having spaced notched portions therein, an outer casing having a slot in the sidewall thereof, a first externally threaded sleeve in connection with said outer casing and surrounding said graduated post, detent means in connection with said first sleeve and engageable with the notched portions of said graduated post, a second internally threaded sleeve, a dial sleeve in connection with the second threaded sleeve having an angular skirt portion surrounding said outer casing and having measurement designations thereon, a bearing in connection with the second threaded sleeve, an arm supporting sleeve connected with said bearing and fixed longitudinally of said second mentioned threaded sleeve and rotatable relative thereto, said arm supporting sleeve closely fitting the inner side of said outer casing, and an arm secured in connection with said arm supporting sleeve and projecting through the slot in the sidewall of said outer casing.

11. In a micrometer height gage of the class described, the combination of a base member, a vertically disposed graduated post mounted on said base member and having spaced notched portions therein, an outer casing having a slot in the side wall thereof, a first externally threaded sleeve in connection with said outer casing and surrounding said graduated post, detent means in connection with said first sleeve and engageable with the notched portions of said graduated post, a second threaded sleeve having split skirt portions and an externally tapered threaded portion, a nut on said externally tapered threaded portion, said split skirt portions provided with an internal screw threaded portion arranged to engage the external screw threads of said first threaded sleeve, a dial sleeve in connection with the second threaded sleeve having an angular skirt portion surrounding said outer casing and having measurement designations thereon, a bearing in connection with the second threaded sleeve, an arm supporting sleeve connected with said bearing and fixed longitudinally of said second threaded sleeve and rotatable relative thereto, said arm supporting sleeve closely fitting the inner side of said outer casing, an arm secured in connection with said arm supporting sleeve and projecting through the slot in the sidewall of said outer casing, said dial sleeve having an opening in one end through which said second sleeve extends, and a nut in screw threaded relation with the outer end of said second threaded sleeve engageable with said dial sleeve for locking the same relatively with said bearing.

12. In a micrometer of the class described, the combination of a graduated post having notched graduation portions therein, a first threaded sleeve surrounding said graduated post and having external micrometer threads thereon, a second threaded sleeve having internal micrometer threads adapted to engage the external micrometer threads of said first sleeve, an outer casing surrounding said threaded sleeves, detent means in connection with said outer casing arranged to engage the graduated notched portions of said graduated post, a dial sleeve surrounding said outer casing and having graduation designations thereon, a bearing in connection with the second threaded sleeve, an arm supporting sleeve secured in connection with said bearing in fixed longitudinal disposition relatively to said second sleeve and rotatable relative thereto, said outer casing being provided with a longitudinal slotted portion and an arm secured in connection with said arm supporting sleeve and extending through said longitudinal slotted portion of said outer casing.

13. In a micrometer of the class described, the combination of a graduated post having notched graduation portions therein, a first threaded sleeve surrounding said graduated post and having external micrometer threads thereon, a second threaded sleeve having internal micrometer threads adapted to engage the external micrometer threads of said first sleeve, an outer casing surrounding said threaded sleeves, detent means in connection with said outer casing arranged to engage the graduated notched portions of said graduated post, a dial sleeve connected to one of said threaded sleeves and surrounding said outer casing and having graduation designations thereon, a bearing in connection with the second threaded sleeve, an arm supporting sleeve secured in connection with said bearing in fixed longitudinal disposition relatively to said second sleeve and rotatable relative thereto, said outer casing provided with a longitudinal slotted portion and an arm secured in connection with said arm supporting sleeve and extending through said longitudinal slotted portion of said outer casing, said arm supporting sleeve fitted closely to the inner wall of said outer casing.

14. In a micrometer of the class described, the combination of a graduated post having notched graduation portions therein, a first threaded sleeve surrounding said graduated post and having external micrometer threads thereon, a second threaded sleeve having internal micrometer threads adapted to engage the external micrometer threads of said first sleeve, an outer casing surrounding said threaded sleeves, detent means in connection with said outer casing arranged to engage the graduated notched portions of said graduated post, a dial sleeve surrounding said outer casing and having graduation designations thereon, a bearing in connection with the second threaded sleeve, an arm supporting sleeve secured in connection with said bearing in fixed longitudinal disposition relatively to said second sleeve and rotatable relative thereto, said outer casing being provided with a longitudinal slot, an arm secured in connection with said arm supporting sleeve and extending through said longitudinal slot of said outer casing, said arm supporting sleeve fitted closely to the inner wall of said outer casing, said second threaded sleeve having an extending threaded end outwardly of said dial sleeve, and a nut secured on said second sleeve outwardly of said dial sleeve and arranged in screw threaded relation therewith and engageable with said dial sleeve for locking the same relatively to said bearing.

15. In a micrometer of the class described, the combination of a graduated post having notched graduation portions therein, a first threaded sleeve surrounding said graduated post and having external micrometer threads thereon, a second threaded sleeve having internal micrometer threads adapted to engage the external micrometer threads of said first sleeve, an outer casing surrounding said threaded sleeves, detent means in connection with said outer casing arranged to engage the graduated notched portions of said graduated post, a dial sleeve surrounding said outer casing and having graduation designations thereon, a bearing in connection with the second threaded sleeve, an arm supporting sleeve secured in connection with said bearing in fixed longitudinal disposition relatively to said second sleeve and rotatable relative thereto, said outer casing provided with a longitudinal slotted portion and an arm secured in connection with said arm supporting sleeve and extending through said longitudinal slotted portion of said outer casing, said arm supporting sleeve fitted closely to the inner wall of said outer casing, said second threaded sleeve having an extending threaded end outwardly of said dial sleeve, a nut secured on said second sleeve outwardly of said dial sleeve and arranged in screw threaded relation therewith and engageable with said dial sleeve for locking the same relatively to said bearing, and a second arm in connection with said graduated post and cooperating with said first arm for taking measurements.

16. In a micrometer height gage of the class described the combination of a graduated post having notched graduation portions therein, a micrometer casing snugly slidable on said post and having detent means in connection therewith engageable with said notched portions of said graduated post, said detent means including a detent plunger movable relative to said casing, a set screw arranged in screw threaded engagement with said casing and threadedly movable into direct contact with said detent member, and a spring arranged to force said detent into said notched graduation portions when the screw is disengaged from said detent member.

17. In a micrometer height gage of the class described the combination of a graduated post having notched graduation portions therein, a micrometer casing snugly slidable on said post and having detent means in connection therewith engageable with said notched portions of said graduated post, said detent means including a detent plunger movable relative to said casing, a set screw arranged in screw threaded engagement with said casing and threadedly movable into direct contact with said detent member, and a spring arranged to force said detent into said notched graduation portions when the screw is disengaged from said detent member, means for limiting the rotational movement of said detent member relatively to said graduated post.

ROBERT R. NOBLE.

REFERENCES CITED

The following references are of record in the file of this patent:

UNITED STATES PATENTS

| Number | Name | Date |
|---|---|---|
| 468,642 | Clapp | Feb. 9, 1892 |
| 1,186,364 | Allington | June 6, 1916 |
| 1,265,287 | Aufuldish | May 7, 1918 |
| 1,291,711 | Auer | Jan. 21, 1919 |
| 1,590,651 | Schustarich | June 29, 1926 |
| 1,596,618 | Morrill | Aug. 17, 1926 |
| 1,655,239 | Priputnevich | Jan. 3, 1940 |
| 2,207,396 | Edelen | July 9, 1940 |
| 2,207,625 | Lester | July 9, 1940 |
| 2,225,500 | Kelsey | Dec. 17, 1940 |